United States Patent
Abdullah et al.

(10) Patent No.: US 10,786,757 B2
(45) Date of Patent: Sep. 29, 2020

(54) COMPACT ELECTROCOALESCER WITH CONICAL FRUSTUM ELECTRODES

(71) Applicants: QATAR UNIVERSITY, Doha (QA); UNIVERSITY OF LEEDS, Leeds (GB); WM Azzopardi, Nottingham (GB)

(72) Inventors: Aboubakr M. Abdullah, Doha (QA); Vincenzino Vivacqua, Doha (QA); Mohammed J. Al-Marri, Doha (QA); Barry Azzopardi, Nottingham (GB); Bijan Kermani, Camberley (GB); Ali Hassanpour, Leeds (GB); Buddhika Hewakandamby, Nottingham (GB); Mojtaba Ghadiri, Leeds (GB)

(73) Assignees: QATAR UNIVERSITY, Doha (QA); UNIVERSITY OF LEEDS, Leeds (GB)

(*) Notice: Subject to any disclaimer, the term of this patent is extended or adjusted under 35 U.S.C. 154(b) by 0 days.

(21) Appl. No.: 15/816,603

(22) Filed: Nov. 17, 2017

(65) Prior Publication Data

US 2018/0140972 A1    May 24, 2018

Related U.S. Application Data

(60) Provisional application No. 62/425,808, filed on Nov. 23, 2016.

(51) Int. Cl.
*B01D 17/06* (2006.01)
*C10G 33/02* (2006.01)
(Continued)

(52) U.S. Cl.
CPC .......... *B01D 17/06* (2013.01); *B01D 17/045* (2013.01); *B03C 11/00* (2013.01); *C10G 33/02* (2013.01); *B03C 2201/02* (2013.01)

(58) Field of Classification Search
CPC .............................. B01D 17/06; B01D 17/045
(Continued)

(56) References Cited

U.S. PATENT DOCUMENTS 1,544,528 A    6/1925   Eddy
1,838,848 A    12/1931  Lawrason
(Continued)

FOREIGN PATENT DOCUMENTS

SU        1269804 A1 * 11/1986

OTHER PUBLICATIONS

Qatar Foundation, "A Compact Electrocoalescer for Better Water-Oil Separation" Aug. 2016. (Year: 2016).*
(Continued)

*Primary Examiner* — Brian W Cohen
(74) *Attorney, Agent, or Firm* — Squire Patton Boggs (US) LLP

(57) ABSTRACT

Certain embodiments may generally relate to systems and methods for developing and improving compact electrocoalescers for in-line dehydration of water-in-oil dispersions. A compact electrocoalescer may include a casing, and a plurality of bare or insulated conical-shaped electrodes housed in the casing. The electrodes may include a metal mesh structure. The electrodes may also be truncated at the apex, and alternatively connected to a power supply and ground. The electrodes may further be stacked in a manner such that at least one electrode is at least partially nested within at least another electrode.

11 Claims, 5 Drawing Sheets

(51) Int. Cl.
  *B03C 11/00* (2006.01)
  *B01D 17/04* (2006.01)
(58) Field of Classification Search
  USPC .................................................. 204/670, 674
  See application file for complete search history.

(56) References Cited

U.S. PATENT DOCUMENTS

| | | | |
|---|---|---|---|
| 1,838,850 | A | 12/1931 | Lawrason |
| 1,926,013 | A | 9/1933 | Garrison |
| 2,027,616 | A * | 1/1936 | Prutzman ............... C10G 33/02 204/563 |
| 2,033,137 | A | 3/1936 | Fisher |
| 2,033,567 | A | 3/1936 | Worthington |
| 2,320,059 | A * | 5/1943 | Bailey ................... C10G 33/02 204/668 |
| 2,775,640 | A | 12/1956 | Steeves |
| 2,855,356 | A | 10/1958 | Stenzel |
| 3,267,860 | A | 8/1966 | Brown |
| 3,531,393 | A | 9/1970 | Roberts |
| 4,116,790 | A | 9/1978 | Prestridge |
| 6,136,174 | A | 10/2000 | Berry et al. |
| 7,150,816 | B2 | 12/2006 | Klocke et al. |

OTHER PUBLICATIONS

Machine translation of SU1269804A1 of Latypov et al. (Year: 1986).*

P. Atten, "Electrohydrodynamics of Dispersed Drops of Conducting Liquid: From Drops Deformation and Interaction to Emulsion Evolution", International Journal of Plasma Environmental Science & Technology, vol. 7, No. 1, Mar. 2013, 11 pages.

P. Atten, "On Electrocoalescence of Water Droplets in an Insulating Liquid", Joseph Fourier University, Grenoble, BP 166-38042, Grenoble—Cedex 9, France, 5 pages.

* cited by examiner

COMPACT ELECTROCOALESCER WITH CONICAL FRUSTUM ELECTRODES

CROSS REFERENCE TO RELATED APPLICATION

This application claims priority to U.S. Provisional Application No. 62/425,808 filed on Nov. 23, 2016. The entire contents of the above-referenced provisional application is hereby incorporated by reference

FIELD OF THE INVENTION

The present invention generally relates to electrocoalescence, and more specifically, to systems and methods for developing and improving compact electrocoalescers for in-line dehydration of water-in-oil dispersions.

BACKGROUND OF THE INVENTION

Generally, coalescence may be defined as a process by which two or more droplets, bubbles, particles, or similar matter merge during contact to form a single progeny droplet, bubble, or particle. The union of these entities may be a result of attractive internal and surface forces or imposed by external force fields.

Emulsion is generally understood as describing a fine dispersion of two or more immiscible liquids that are normally insoluble, unmixable or unblendable in each other. In an emulsion, one liquid (the dispersed phase) may be dispersed in the other (the continuous phase). An example of an emulsion may include an oil-in-water emulsion, wherein the oil is the dispersed phase, and water is the continuous medium. However, they can also form a water-in-oil emulsion, wherein water is the dispersed phase and oil is the continuous external phase.

Another example of an emulsion is known as a crude oil emulsion. Such an emulsion may be separated into an oil phase and a water phase. This process is generally known as oil demulsification. Generally, from a process point of view, the oil producer is interested in three aspects of demulsification: (1) the rate or the speed at which this separation takes place; (2) the amount of water left in the crude oil after separation; and (3) the quality of separated water for disposal. Produced oil generally has to meet company and pipeline specifications. For example, water is usually the most significant by-product of oil and gas production, and the amount of produced water increases as the well matures.

Typically, the oil must not contain more than 0.2% basic sediment and water (BS&W) before further processing, and 10 pounds (4.53 kg) of salt per thousand barrels (159 m$^3$) of crude oil. The salt is insoluble in oil and associated with residual water in the treated crude. Thus, low BS&W and salt content is crucial to avoid corrosion of the process equipment, catalyst poisoning during oil refining and extra transportation cost due to increased volume as well as increased viscosity.

The separation of water from oil is an essential element of the hydrocarbon production, extraction, and chemical processing industries. Compared to other methods, electrical demulsification is considered to be potentially superior in terms of energy efficiency. Furthermore, it is also environmentally friendly, as the need for chemical demulsifiers is reduced or even eliminated. However, most of the commercially available electrocoalescers are large, and present efforts in the oil industry are aimed at making coalescers more compact.

Available coalescers mainly rely on the slow migration of droplets through the viscous oil, instead of optimizing the coalescence process. For instance, they make use of insulated electrodes so that the electrophoretic driving force for coalescence is absent. Further, the electrodes are usually flat plates, grids, or coaxial cylinders, where the emulsion essentially flows over and parallel to the electrode surface, while the role played by the geometry of the electrode has not been given major attention.

Additionally, existing electrocoalescers are far from being compact. Electrocoalescence devices in the crude oil industry are bulky, and are often divided into a "treating space" for the droplet growth and a "settling zone" for phase separation. Although some in-line electrocoalescers are available in the market, they are still of limited effectiveness. This stems from the fact that these coalescers mainly rely on the slow migration of water droplets through the viscous oil, instead of optimizing the coalescence process. They also make use of insulated electrodes to avoid short-circuiting, especially with high water content, so that the electrophoretic driving force for coalescence is absent. However, the geometry of the electrodes can significantly affect the process efficiency and novel electrode designs are highly desirable for more effective operations.

There is a need, therefore, for a system and/or method that are capable of providing efficient separation of two immiscible liquids that can be applied to oil, chemical, and biochemical industries. However, the principal end user is the hydrocarbon industry. There is also a need for developing compact electrocoalescers for in-line dehydration of water-in-oil dispersions. In addition, considering that the world crude oil production is several millions of barrels per day, a more efficient technology for water/oil separation is needed so that more economical profits can be achieved for the oil industry. There is a further need for a system that does not have to be operated under high electric fields, a system in which short-circuiting can be avoided, and a system capable of immediately pushing away large water drops as soon as they form.

SUMMARY OF THE INVENTION

One embodiment is directed to a compact electrocoalescer. The compact electrocoalescer may include a casing, and a plurality of bare conical-shaped electrodes housed in the casing. It is also possible to use insulated electrodes, albeit less effective. The electrodes may include a metal mesh structure. The electrodes may also be truncated at the apex, and alternatively connected to a power supply and ground. The electrodes may also be stacked in a manner such that at least one electrode is at least partially nested within at least another electrode.

According to an embodiment, an electric field in the electrodes may be aligned with the direction of the flow of a liquid dispersion. According to another embodiment, the spacing between each electrode may be adjustable.

In an embodiment, a sieve aperture of at least one of the electrodes may be selected depending on an initial droplet size. In another embodiment, the diameter of the hole at the truncated apex of the electrodes is smaller than 20% of the internal diameter of the casing and selected according to an initial droplet size distribution in an emulsion.

Another embodiment is directed to a method for in-line dehydration of a water-in-oil dispersion. The method may include running the dispersion through a plurality of bare conical-shaped electrodes housed in a casing, with metal mesh structures. Insulated electrodes may also be used, albeit less effective. In an embodiment, the electrodes may be stacked in a manner such that at least one electrode is at least partially nested within at least another electrode. The method may also include applying an electric field to the electrodes. The method may further include aligning the electric field with the direction of the flow of the dispersion. The method may also include separating water from the dispersion. In an embodiment, the electrodes may be truncated at the apex, and alternatively connected to a power supply and ground.

In an embodiment, the method may include flowing a dispersed aqueous phase towards a central region of the electrodes to facilitate phase separation. In another embodiment, the electric field may be aligned in the direction of flow of the dispersion. According to an embodiment, the spacing between each electrode is adjustable. In an embodiment, a sieve aperture of at least one of the electrodes may be selected depending on the initial droplet size distribution in an emulsion. In another embodiment, the diameter of the hole at the truncated apex of the electrodes may be smaller than 20% of the internal diameter of the casing, and selected according to an initial droplet size distribution in an emulsion.

Additional features, advantages, and embodiments of the invention are set forth or apparent from consideration of the following detailed description, drawings and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings.

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical or structural changes may be made to the invention without departing from the spirit or scope of this disclosure. To avoid detail not necessary to enable those skilled in the art to practice the embodiments described herein, the description may omit certain information known to those skilled in the art The following detailed description is, therefore, not to be taken in a limiting sense.

DETAILED DESCRIPTION OF THE INVENTION

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention.

Certain embodiments may be directed to compact electrocoalescers for in-line dehydration of water-in-oil dispersion. Coalescence may be enhanced by applying electric fields, which may include dipole-dipole attraction among the water droplets and electrophoretic forces on charged droplets. However, the main bottleneck in the current technology is that the migration time is still too long, and hence, the coalescer volume is often still large. This is highly undesirable, particularly in offshore exploration, and at the well head, where the best arrangement would be provided by an in-line coalescer, with a diameter no bigger than the pipe itself, able to separate the water before it is pumped up the well.

Figures 1A, 1B:
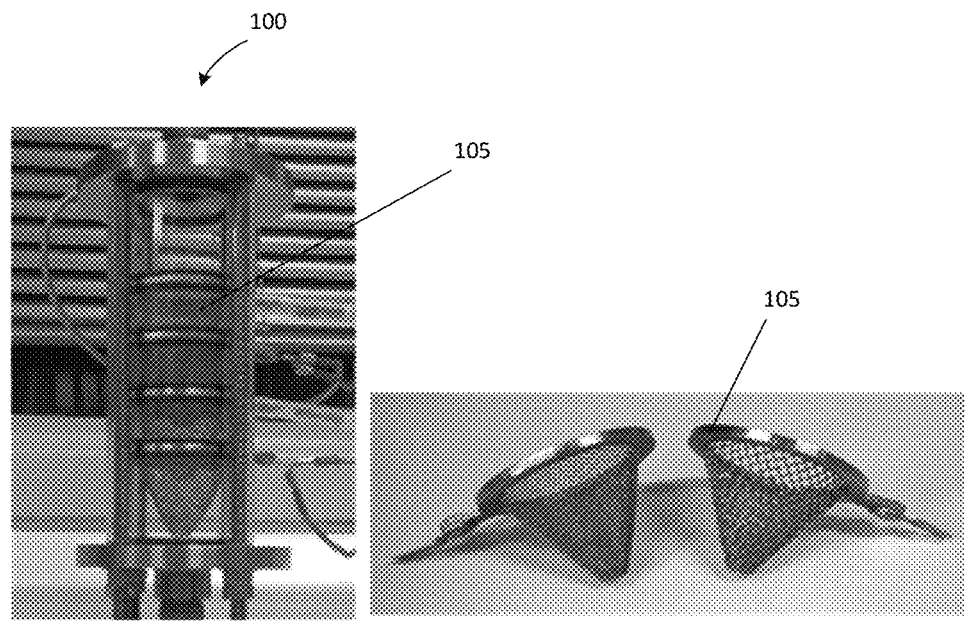
FIG. 1(a) shows an exemplary electrocoalescer with conical frustum mesh electrodes.
FIG. 1(b) shows an exemplary electrode geometry used in an electrocoalescer.

Referring to FIG. 1(a), there is shown an exemplary electrocoalescer apparatus 100 with a plurality of conical frustum mesh electrodes 105, according to an embodiment, in this design, the electrodes 105 may be made of metal wire mesh, and may be of a bare electrode type. They may also be insulated. The electrodes 105 may be shaped in a variety of ways. In one embodiment, the electrodes 105 may be in, but not limited to, the shape of conical frustum electrodes. The electrodes 105 may also be lined consecutively, and consecutive electrodes 105 may be alternatively connected to a high voltage source and ground, respectively, forming an electrode set. According to one embodiment, many sets of electrodes 105 may be stacked vertically or horizontally. The vertical design directs the coalesced and enlarged drops to the center, where they go through the opening in the frustum apex, thereby facilitating phase separation. Depending on the phase velocity of the emulsion, this feature might not prevail if the electrodes are stacked horizontally. The design of the electrodes 101 may also result in an advantage in its modular nature, as electrodes may be conveniently added, removed, or replaced, and the spacing between the electrodes may be varied.

Referring to FIG. 1(b), there is shown an exemplary electrode geometry used in the electrocoalescer apparatus 100, according to an embodiment. According to certain embodiments, the geometry of the electrodes 105 may be characterized by different mesh sizes. For example, in an embodiment, the electrodes 105 may have sieve openings of 1 or 2 mm. However, in other embodiments, the electrodes 105 may have sieve openings of different sizes. According to an embodiment, the electrodes 105 of the electrocoalescer apparatus 100 may all have the same sieve opening dimension. According to another embodiment, the electrodes 105 of the electrocoalescer apparatus 100 may have each have different sieve opening dimensions, or sets of the same or different sieve opening dimensions. According to the designs of the electrodes 105 in certain embodiments, it is possible to develop a compact electrocoalescer.

In certain embodiments, the interaction between the water droplets and electrodes 105 may play a central role in the coalescence mechanism. In contrast to current designs, the emulsion, according to certain embodiments, essentially goes through the electrode rather than flowing over it. This brings about numerous benefits enhancing the coalescence substantially. Coalescence may improve when the water droplets are brought into contact with a metal surface, as droplets get charged when intercepted by the electrodes 105. The use of wire mesh may increase the contact area, and the conical mesh arrangement allows the electrodes 105 to be nested, thus leading to a further increase in surface area in a compact way. Further, using bare electrodes may promote coalescence both by dipole-dipole interactions and electrophoresis. The wire geometry enhances polarization in the electrode vicinity, thus increasing the coalescence rate. Furthermore, the electrodes wettability can be manipulated by surface treatment to enhance phase separation. Insulated electrodes may also be used, albeit less effective.

Water accumulated on the wire mesh of the electrodes 105 may promote an additional effective mechanism of droplet-interface coalescence. The electric field may be aligned with the direction of the flow, thus ensuring the maximum electrical attractive force between neighboring droplets. In addition, the conical shaped electrodes 105 may induce preferential flow of the dispersed aqueous phase towards the central region of the electrocoalescer apparatus 100, i.e. near the axis, thus facilitating phase separation. Implementations of certain embodiments do not require the use of high electric fields.

Figure 2:
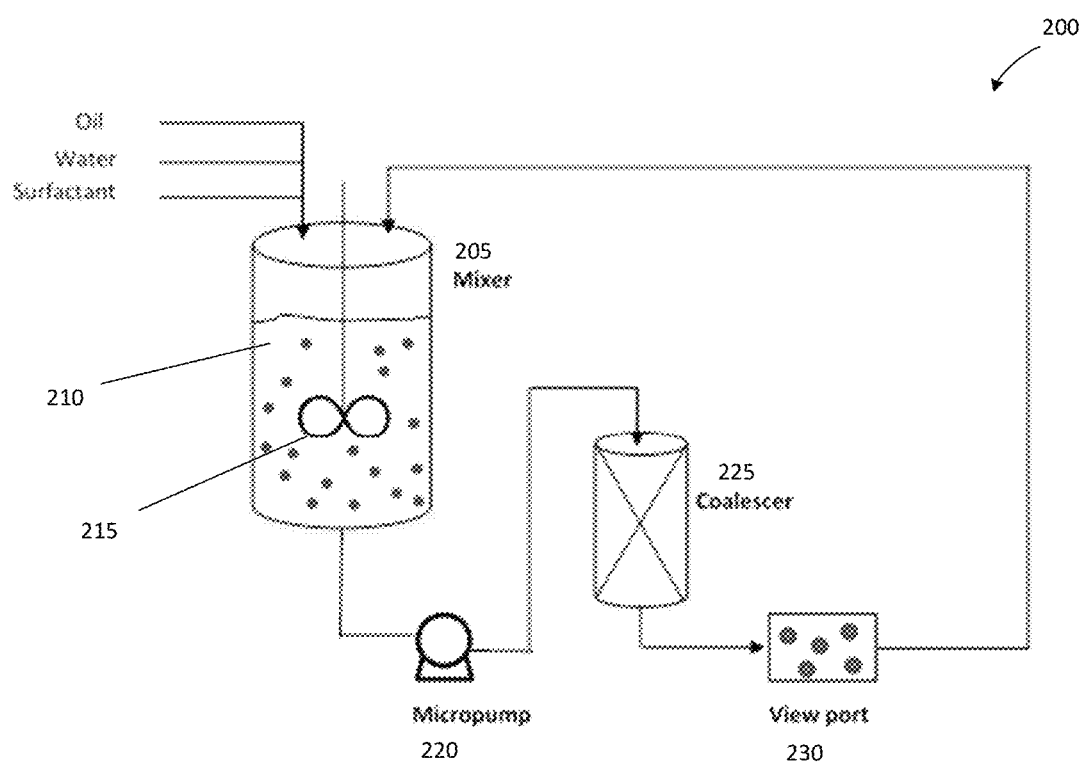
FIG. 2 shows an exemplary rig for testing the electrocoalescer design.

Referring to FIG. 2, there is shown an exemplary rig 200 for testing the electrocoalescer design, according to an embodiment. The exemplary rig 200 may be fabricated to test the efficiency of different compact electrocoalescer designs in terms of water droplet growth. FIG. 2 shows a schematic setup of the rig 200. Here, the rig 200 may operate in a closed loop. Oil and water may be added to the reservoir 210 to form a tight dispersion by means of the shear generated by a mechanical stirrer 215 or any other high shear emulsifier. The dispersion then flows through a micropump 220. In an embodiment, some surfactant may be added to the reservoir 210 along with the oil and distilled water. After forming the tight dispersion, the dispersion may then be admitted to the electrocoalescer section 225 where an electric field may be set up between pairs of electrodes. The output of the coalescer 225 may then be sent to a very thin transparent cell, or view port 230, where droplet growth may be evaluated by means of image processing and analysis of video records of a high-speed camera.

Figure 3:
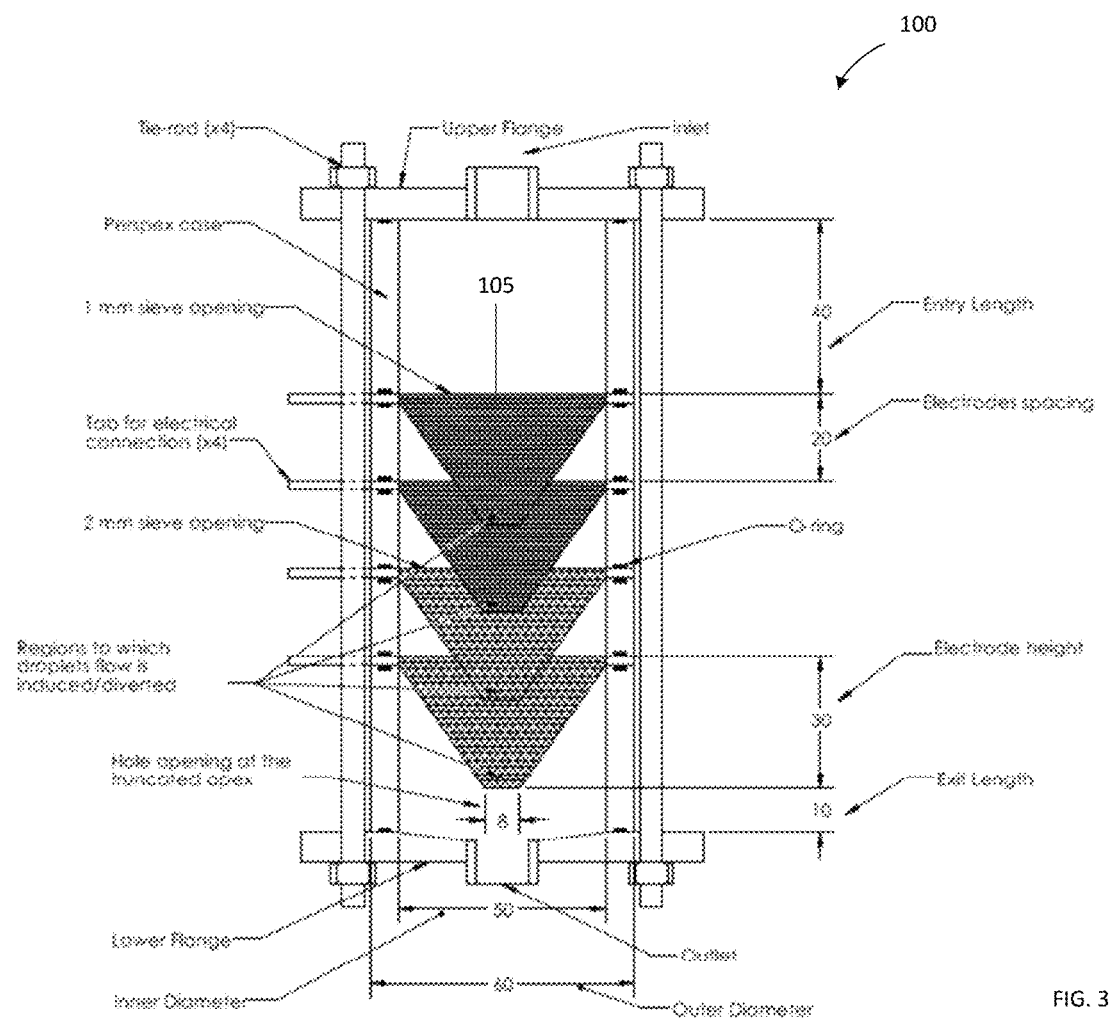
FIG. 3 shows an exemplary detailed computer-aided design (CAD) drawing for the electrocoalescer shown in FIG. 1(a).

Referring to FIG. 3, there is shown a detailed CAD drawing of the electrocoalescer apparatus 100 shown in FIG. 1. As shown in FIG. 3, the electrocoalescer apparatus 100 may include multiple cone electrodes, such as for example, four mesh cone electrodes 105. In any embodiments, at least two consecutive electrodes are necessary, forming an electrode set in order to set up an electric field. Each electrode set may have sieve apertures of identical sizes. In some alternatives, each electrode set may have sieve apertures of different sizes. The electrodes 105 may be truncated at the vertex to facilitate passage of large water drops. These electrodes 105 may be alternatively connected to a high voltage power supply and ground. A couple of electrodes 105 of various sieve aperture sizes may be installed at the top of the electrocoalescer 100. For example, in an embodiment, the electrocoalescer apparatus 100 may contain two electrode sets. The first electrode set may contain two electrodes 105 located at the top of the electrocoalescer 100. Each electrode 105 may have about a 1 mm sieve aperture. In other embodiments, the sieve aperture may be greater than 1 mm or smaller than 1 mm. The second electrode set 105 may have different size sieve openings, and may be inserted downstream of the first electrode set. For example, in an embodiment, the second electrode set may also contain the couple of electrodes 105 at the bottom of the electrocoalescer 100. Each electrode 105 may have about a 2 mm sieve aperture. In other embodiments, the sieve aperture may be greater than 2 mm or smaller than 2 mm. These figures are merely given as illustrative examples. In an embodiment, the sieve aperture may be selected depending on the initial droplet size distribution in the emulsion. Although such an arrangement of the electrodes 105 is shown in FIG. 3, other combinations of how the electrodes 105 are arranged and the sizes of their corresponding sieve openings may also be possible.

As further shown in FIG. 3, the length of the truncated base may be about 8 mm, although other lengths may also be possible, depending on the operating scale. The central opening may be introduced to induce possible preferential flow of water droplets towards the center of the device. FIG. 3 also shows about a 50 mm inner diameter (ID) cylindrical Perspex case that contains four electrodes 105, and has about a 60 mm outer diameter. However, other sizes of the ID cylindrical Perspex case may also be possible. Neighboring electrodes 105 may be separated from each other by a distance of about 20 mm, which may allow imposing a maximum electric field strength below the field breakdown, which is about 1 MV/m for the emulsions used in this work. However in practice much lower filed strengths may be used (around 0.1 MV/m). In other embodiments, all of the electrodes 105 may be separated at different distances or a combination of the same and different distances, and the electric field strength may also be varied. Further, the electrocoalescer 100 may have an entry length of about 40 mm. However other entry lengths may also be possible in other embodiments. Depending on the main pipe size, a conical entry section may be inserted to avoid a sudden expansion.

The various dimensions of the components of the electrocoalescer 100 described above are not so limited. For example, in other embodiments, other dimensions of the components, including, for example, the sieve aperture, truncated apex, ID cylindrical Perspex case, and separation distance between the electrodes, may be available. The electrodes may also be set up horizontally. According to certain embodiments, the dimensions of the various components of the electrocoalescer 100 may depend on the dispersion flow rate and the inlet droplet size distribution. For example, in certain embodiments, for large flow rates, a larger number of stages and/or parallel arrangement of coalescer may be required. The average residence time in each coalescer may vary. For example, in an embodiment, the average residence time in each coalescer may be at least 1-2 minutes. In some embodiments, the electrodes may form a progression of sieves with openings of various sizes. For example, in an embodiment, the sieves may have openings which vary from 0.1-2 mm, considering that the initial average droplet size of a practical crude oil-water emulsion is about 0.05 mm.

As further shown in FIG. 3, the electrocoalescer 100 may have electrodes with about a 30 mm vertical length, which may determine the inclination of the conical lateral surface. In an embodiment, about a 50° inclination angle may be selected. At such an angle, it may be possible to promote rolling of the water droplets over the electrode surface towards the central region. However, in other embodiments, other angles, including, for example, steeper angles, may be selected. For example, in one embodiment, the angle may be between 45° and 75°. In addition, according to other embodiments, the hole opening at the truncated apex of the electrodes may be larger than the size of the enlarged drops. For example, in an embodiment, the hole opening may be at least 4-5 times the maximum drop size expected. In another embodiment, the hole opening may not be larger than about 20% of the internal diameter of the case.

In addition, other field strengths of the electric field may also be available. For example, in an embodiment, the field strength may vary along the device, with the applied voltage of consecutive electrodes sets decreasing in the direction of flow (as coalescence takes place). In another embodiment, the field strength may be lower than the dielectric strength of the oil which may be, however, usually high. For example, in an embodiment, the applied voltage may be in the order of 0.05-1 kV/mm. Furthermore, in certain embodiments, the field strength may not exceed about 1 kV/mm to avoid the breakage of drops, such as drops with a size of 1 mm. On the other hand, in embodiments where strengths are lower than 0.01 kV/mm may be insufficient to promote coalescence. Thus, a range for the field strength may be, according to certain embodiments, 0.01-1 kV/mm.

Figures 4A, 4B:
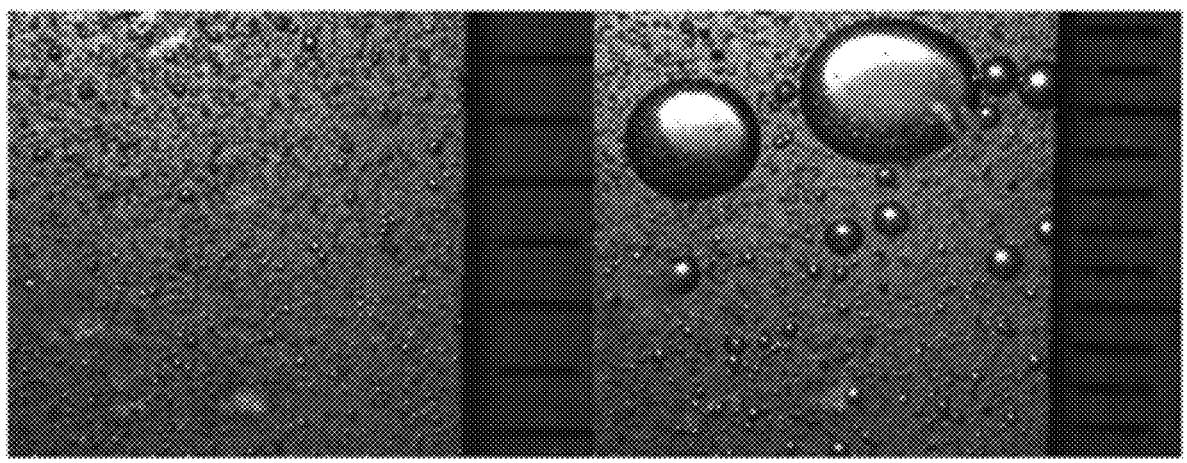
FIG. 4(a) shows an exemplary initial droplet size distribution (scales are in mm).
FIG. 4(b) shows an exemplary size distribution of droplets after the application of a 1 kV/16 mm field (scales are in mm).

Referring to FIGS. 4(a) and 4(b), there is shown an exemplary initial water droplet size distribution, according to an embodiment, and an exemplary size distribution after the application of about a 1 kV/16 mm field, according to another embodiment, respectively. Both FIGS. 4(a) and 4(b) are scaled in mm, i.e. each division shows 1 mm. FIGS. 4(a) and 4(b) show the result of interactions between the metal wires and the dispersed water phase, which were found to enhance coalescence to a great extent. According to FIGS. 4(a) and 4(b), sunflower oil and water (5% vol) were used as experimental liquids, and about a 1 kV/16 mm constant electric field was applied between the electrodes.

The initial average size of droplets in the dispersion before the application of the electric field was relatively small, as seen in FIG. 4(a). However, as seen in FIG. 4(b), very large drops started coming out of the coalesces after the application of the electric field. According to certain embodiments, similar results may be obtained using silicon oil as the continuous phase. According to other embodiments, the use of pulsed DC fields may be applied, which may further improve the overall performance of the electrocoalescer.

In some embodiments, the interaction between the water droplets and bare electrodes may play a central role in the coalescence mechanism. The water droplets become charged when intercepted by the electrodes and start coalescing even before reaching the electrodes, i.e. in a narrow region above the surface of the first electrode, and entering the region between the electrodes due to local electric field gradients and polarization mechanism. The region between the electrodes may be located downstream of the first electrode. In certain embodiments the main coalescence region may be enclosed between the conical surfaces of the electrodes. Further the geometry of the electrocoalescer, according to certain embodiments, ensures that the contact area between the electrodes and the droplets is large, thereby enhancing both droplet-droplet and droplet-interface coalescence.

Figure 5:
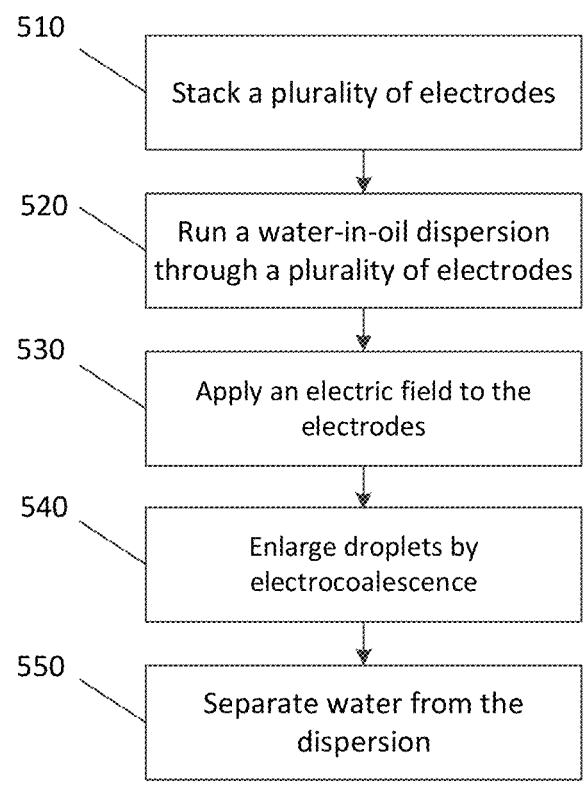
FIG. 5 shows a flow chart of an exemplary process, according to an embodiment.

Referring to FIG. 5, there is shown a flow chart of an exemplary process, according to an embodiment. In certain embodiments, the process of FIG. 5 may be performed with a compact dectrocoalescer, where the compact electrocoalescer may be for in-line dehydration of dispersions, including, for example, a water-in-oil dispersion. The process may include, at 510, stacking a plurality of electrodes. The process may also include, at 520, running a water-in-oil dispersion through a plurality of bare conical-shaped electrodes with metal mesh structures.

According to certain embodiments, the electrodes may be arranged such that at least a portion of at least one electrode is nested within a portion of at least another electrode. In other embodiments, the electrodes may be truncated at the vertex, and alternatively connected to a high voltage power supply and ground. According to certain embodiments, the electrodes may be stacked vertically, and the spacing between the electrodes may be adjustable. They may also be stacked horizontally. In addition, some of the electrodes may have a sieve aperture of about 1 mm, whereas other electrodes may have a sieve aperture of about 2 mm. In further embodiments, the truncated vertex may have an opening of about 8 mm, and the electrodes may be separated from each other by a distance of about 20 mm. In other embodiments, the electrodes may have sieve openings and truncated apex hole of different sizes.

The process may also include, at 530, applying an electric field to the electrodes. According to certain embodiments, the electric field applied may have an electric field strength of about 1 kV/16 mm, however, other electric field strengths may also be possible. Pulsatile fields can also be conveniently used to increase the process efficiency. In an embodiment, the electric field may be aligned with the direction of the flow of the dispersion.

The process may further include, at 540, enlarging the droplets by electrocoalescence. The process may also include, at 550, separating water from the dispersion.

Example embodiments of the invention may provide several technical improvements. For example, according to certain embodiments, use of bare electrodes may promote coalescence both by dipole-dipole interaction, electrophoresis, and to a certain extent, dielectrophoresis. Nevertheless, insulating electrodes may also be used, albeit to lesser effect. Advantages of certain embodiments may include the modular nature of the electrocoalescer, as electrodes may be conveniently added, removed, or replaced, and the spacing between the electrodes may be easily varied. In addition, the electric field may be aligned with the direction of the flow, thus ensuring the maximum electrical interaction between neighboring droplets. Implementation of certain embodiments of the electrode arrangement does not require the use of high electric fields, thus reducing power consumption, making the overall functionality of the device more energy efficient.

According to certain embodiments, it may also be possible to achieve significant improvements in oil-water separation and to a compact separator device, which could be installed down the well. Doing so may result in a reduction of costs for water processing, transportation, and mitigating corrosion. It is also possible to design a compact subsea separation system.

In addition to achieving efficient separation from crude oil and the novel design of compact electro-separators, there may also be potential applications in both emulsification and de-emulsification of water in oil systems, reactive and crystallizing emulsifications, and encapsulation. As the dispersed water droplets are electrically charged, it may be possible to devise selective coalescence with oppositely charged droplets containing special reagents, enabling the possibility of carrying out complex reactions with good control on yield and conversion.

Although the foregoing description is directed to the preferred embodiments of the invention, it is noted that other variation and modifications will be apparent to those skilled in the art, and may be made without departing from the spirit or scope of the invention. Moreover, features described in connection with one embodiment of the invention may be used in conjunction with other embodiments, even if not explicitly stated above.

We claim:

1. A compact electrocoalescer, comprising:
   a casing; and
   a plurality of conical-shaped electrodes housed in the casing,
   wherein the plurality of conical-shaped electrodes comprise a metal mesh structure,
   wherein the plurality of conical-shaped electrodes are truncated at the apex, and alternatively connected to a power supply and ground, and
   wherein the plurality of conical-shaped electrodes are stacked in a manner such that at least one electrode is at least partially nested within at least another electrode.

2. The electrocoalescer according to claim 1, wherein an applied electric field is aligned with a direction of a flow of a liquid dispersion within the casing.

3. The electrocoalescer according to claim 1, wherein spacing between each electrode is adjustable.

4. The electrocoalescer according to claim 1, wherein a sieve aperture of at least one of the electrodes is selected depending on an initial droplet size distribution in an emulsion.

5. The electrocoalescer according to claim 1, wherein a diameter of a hole at the truncated apex of the plurality of electrodes is smaller than 20% of the internal diameter of the casing and selected according to an initial droplet size distribution in an emulsion.

6. A method for in-line dehydration of a water-in-oil dispersion, comprising:
   running the dispersion through a plurality of bare or insulated conical-shaped electrodes housed in a casing, wherein the plurality of bare or insulated conical-shaped electrodes comprise a metal mesh structure and wherein the electrodes are stacked in a manner such that at least one electrode is at least partially nested within at least another electrode;
   applying an electric field to the plurality of electrodes; and
   separating water from the dispersion, wherein the electrodes are truncated at the apex, and alternatively connected to a power supply and ground.

7. The method according to claim 6, further comprising flowing a dispersed aqueous phase towards a central region of the plurality of electrodes to facilitate phase separation.

8. The method according to claim 6, wherein the electric field is aligned in the direction of flow of the dispersion.

9. The method according to claim 6, wherein spacing between each electrode is adjustable.

10. The method according to claim 6, wherein a sieve aperture of at least one of the electrodes is selected depending on the initial droplet size distribution in an emulsion.

11. The method according to claim 6, wherein the diameter of the hole at the truncated apex of the plurality of electrodes is smaller than 20% of the internal diameter of the casing and selected according to an initial droplet size distribution in an emulsion.

* * * * *